United States Patent [19]

Ramos et al.

[11] Patent Number: 4,976,487
[45] Date of Patent: Dec. 11, 1990

[54] COLLAPSIBLE CAR WINDOW CANOPY APPARATUS

[76] Inventors: Frank Ramos, 311 Olive Ave., Wahiawa; Robert T. Lee, 242 California Ave., Honolulu, both of Hi. 96786

[21] Appl. No.: 410,170

[22] Filed: Sep. 19, 1989

[51] Int. Cl.$^5$ ................................. B60J 3/00
[52] U.S. Cl. .................................. 296/152; 296/163; 160/370.2; 160/DIG. 4
[58] Field of Search .................. 296/152, 163; 160/57, 160/58.1, 62, 78, 80, 370.2, DIG. 4

[56] References Cited

U.S. PATENT DOCUMENTS

| | | | |
|---|---|---|---|
| 1,180,124 | 4/1916 | Foedisch | 160/370.2 X |
| 1,180,589 | 4/1916 | Kubat | 160/370.2 X |
| 1,378,510 | 5/1921 | Ackerland | 160/370.2 X |
| 1,576,886 | 3/1926 | Williams | 160/DIG. 4 |
| 2,204,432 | 6/1940 | Morgadanes | 160/370.2 X |
| 2,593,909 | 4/1952 | Moreland | 296/152 |
| 2,594,238 | 4/1952 | Weisker | 296/44 |
| 2,657,089 | 10/1953 | Kaul | 296/44 |
| 2,774,641 | 12/1956 | Borders, Jr. et al. | 311/22 |
| 2,829,711 | 4/1958 | Hiller | 160/57 |
| 3,152,832 | 10/1964 | Kamp | 160/370.2 X |
| 3,743,345 | 7/1973 | Eckman et al. | 296/163 |
| 4,050,732 | 9/1977 | MacIsaac | 296/159 |
| 4,160,458 | 7/1979 | Marcellus | 296/160 X |
| 4,192,543 | 3/1980 | Crawford | 296/159 |
| 4,799,422 | 1/1989 | Birt | 160/370.2 X |
| 4,862,940 | 9/1989 | Atchison | 296/163 X |

FOREIGN PATENT DOCUMENTS 2491009 4/1982 France ........................... 296/152

Primary Examiner—Margaret A. Focarino
Assistant Examiner—Joseph D. Pape
Attorney, Agent, or Firm—Henderson & Sturm

[57] ABSTRACT

A collapsible canopy apparatus (10) for use with the window frame (101) of a vehicle (100) wherein the canopy apparatus (10) includes a cover member (30) having an extension flap (33) adapted to be formed into a closed loop around the upper window frame portion (101") and a collapsible framework member (14) having a plurality of telescoping leg members (15) that are operatively secured to one another by a pair of floating hinge elements (16); wherein, a first pair of leg members (15) are operatively connected to the lower window frame portion (101') and a second pair of leg members (15) are operatively attached to the cover member (30).

6 Claims, 1 Drawing Sheet

COLLAPSIBLE CAR WINDOW CANOPY APPARATUS

TECHNICAL FIELD

The present invention relates generally to the field of awning or canopy apparatus used in conjunction with a vehicle.

BACKGROUND OF THE INVENTION

As can be seen by reference to the following U.S. Pat. Nos.: 2,657,089; 2,774,641; 2,593,909; and, 2,594,238 the prior art is replete with myriad and diverse awning-/canopy arrangements.

While all of the aforementioned prior art constructions are more than adequate for the basic purpose and function for which they have been specifically designed, these prior art devices are also equally deficient with respect to either their lack of collapsability and/or lack of compactness when the devices are not deployed on a vehicle window.

Obviously anyone who would be inclined to employ a canopy or awning on a vehicle body would only do so on an occasional basis; and, as such it comes as somewhat of a surprise that the developers of the prior art apparatus did not pay more attention to the features of compactness and/or collapsability of their constructions.

As a result of the foregoing situation there has existed a longstanding need among users of this type of a device for a new and improved collapsible car window canopy apparatus that will be simple to install, adjustable to fit a wide variety of car windows, collapsible, and very compact for storage purposes; and, the provision of such a device is the stated objective of the present invention.

SUMMARY OF THE INVENTION

Briefly stated, the collapsible car window canopy apparatus that forms the basis of the present invention comprises a collapsible framework unit, a cover unit, and an auxiliary screen unit.

The collapsible framework unit comprises a pivoted framework assembly including a plurality of adjustable length leg members which are operatively connected to one another via a pair of floating link members. In addition, two of the plurality of adjustable leg members are provided with clamp members on their outboard ends wherein the clamp members are adapted to engage a portion of the vehicle window frame and to provide support to the remainder of the framework assembly.

The cover unit comprises a generally flexible cover member which is dimensioned to overlie and extend along the sides of the framework unit; wherein, the inboard end of the cover member is provided with a plurality of fastener elements, such that the inboard end of the cover member may be formed into a closed loop.

The auxiliary screen unit comprises a flexible screen member having one end that is adapted to be releasably secured and suspended from one of the plurality of fastener elements that are disposes on the inboard end of the cover member.

As will be explained in greater detail further on in the specification the floating hinge elements and the telescoping nature of the framework leg elements allow the framework unit to be collapsed into a very compact structure and the flexible nature of the cover unit and the auxiliary screen unit allow these components to be folded, such that the entire apparatus will occupy very little storage space while not in use.

BRIEF DESCRIPTION OF THE DRAWINGS

These and other objects, advantages, and novel features of the invention will become apparent from the detailed description of the invention and will become apparent from the detailed description of the the best mode for carrying out the preferred embodiment of the invention which follows; particularly when considered in conjunction with the accompanying drawings, wherein.

BEST MODE FOR CARRYING OUT THE INVENTION

Figure 1:
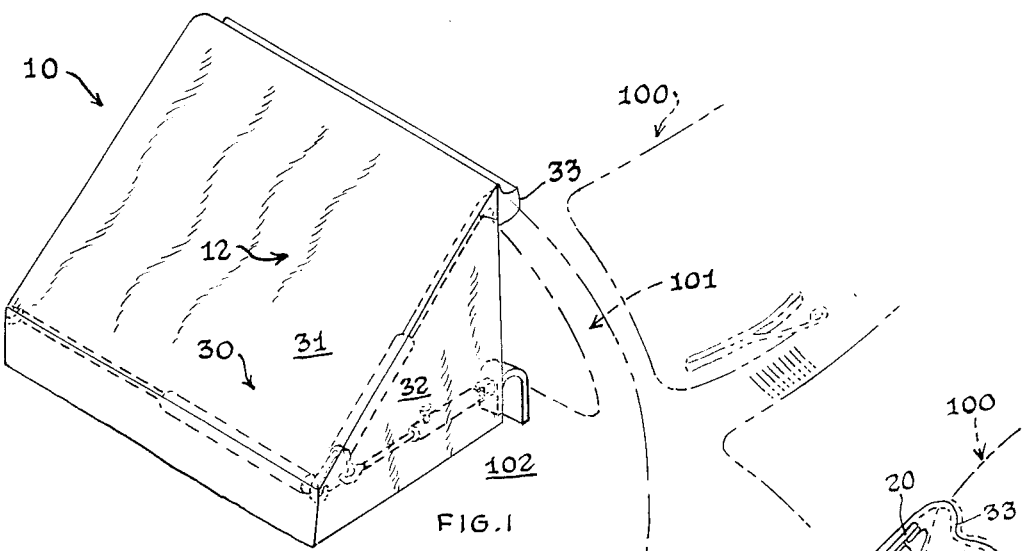
FIG. 1 is a perspective view of the apparatus installed on a vehicle.
Figure 2:
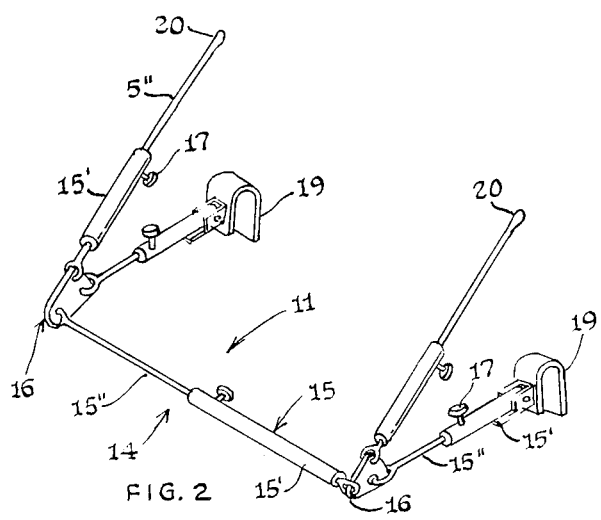
FIG. 2 is an isolated perspective view of the collapsible framework unit.

As can be seen by reference to the drawings and in particular to FIGS. 1 and 2, the collapsible car window canopy apparatus that forms the basis of the present invention is designated generally by the reference numeral (10). The canopy apparatus (10) comprises in general: a framework unit (11); a cover unit (12); and, an auxiliary screen unit (13). These units will now be described in seriatim fashion.

Figure 3:
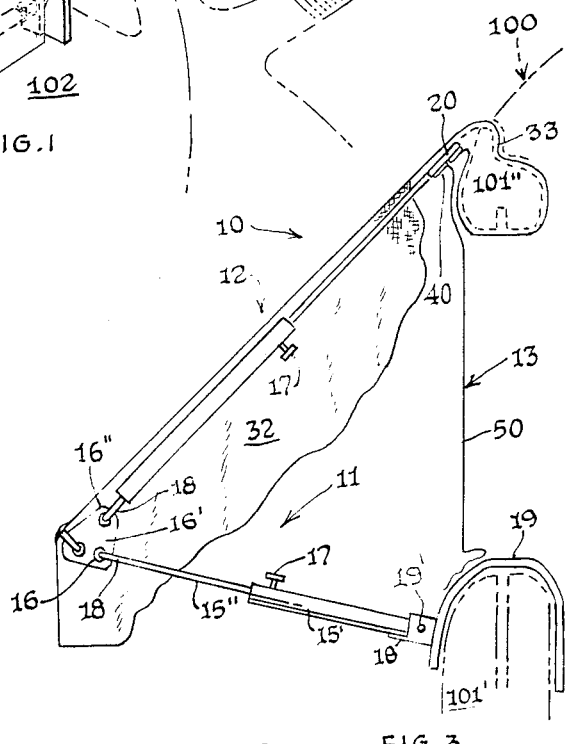
FIG. 3 is a cross-sectional view of the apparatus taken through line 3—3 of FIG. 1.

Turning now to FIG. 3, it can be seen that the framework unit (11) comprises a collapsible framework member (14) including a plurality of telescoping leg members (15) that are operatively secured to one another by a pair of floating hinge elements (16).

Figure 4:
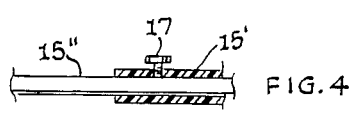
FIG. 4 is a cross-sectional view of one of the telescoping leg members of the framework unit.

As shown in FIGS. 2 thru 4, each of the telescoping leg members is provided with an enlarged hollow cylindrical end (15') and a narrow rod shaped end (15") which are slidable relative to one another; and, wherein each of the telescoping leg members (15) is further provided with releasable securing means (17) for temporarily immobilizing the ends (15') (15") of each of leg members (15) to one another in a well recognized fashion.

In addition, at least one of the ends (15')(15") of the telescoping leg members (15) are provided with an eyelet element (18) which is operatively engaged with one of the floating hinge elements (16). Furthermore a first pair of leg members (15) is provided with clamp elements (19) having a pivot element (19') disposed on the inboard ends of the first pair of leg members; and, a second pair of leg members (15) is provided with tip portions (20) which are disposed on the inboard ends of the second pair of leg members. Finally, a cross-piece leg member (15) operatively secures the first and second pairs of leg members (15) and the pair of floating hinge elements (16) together.

As can best be seen by reference to FIGS. 1 and 3, the canopy apparatus (10) is intended to be used in the window frame (101) of the door (102) of a vehicle (100) wherein the window frame (101) includes a lower window frame portion (101') and a lower window frame portion (101"); wherein the cooperation between the canopy apparatus (10) and the window frame (101) will be explained shortly.

Figure 5:
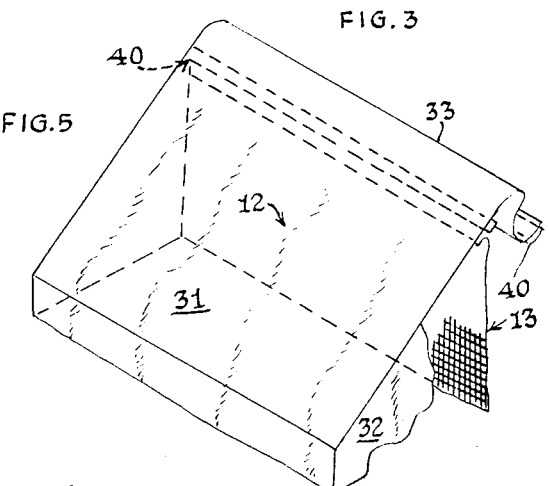
FIG. 5 is a cut away perspective view of the cover unit and the auxiliary screen unit.

As shown in FIGS. 1, 3 and 5, the cover unit (12) comprises a skirted cover member (30) having an elongated generally rectangular top panel (31) and a pair of side panels (32) wherein the inboard end of the top panel (31) is provided with an extension flap (33). In addition, a plurality of securing means (40) are disposed on the extension flap (33) and the underside of the top panel (31) such that the extension flap (33) may be formed into a closed loop around the upper window frame portion (101") as depicted in FIG. 3; and the auxiliary screen unit (13) may be suspended from the cover unit (12).

The auxiliary screen unit (13) comprises a sheet of netting (50) whose upper end is provided with securing means (40) which are adapted to cooperate with a selected one of the plurality of securing means (40) on the underside of the top panel (31) of the cover member (30) such that the sheet of netting (50) may be suspended beneath the cover member (30) to prevent insects from entering the open window of the vehicle (100).

As can also be seen best by reference to FIG. 3, each of the pair of floating hinge elements (16) comprise a generally triangular hinge plate (16') having enlarged apertures (16") formed proximate to the corners of the hinge plate (16'); wherein, the apertures (16") are dimensioned to loosely engage the eyelets (18) on the outboard ends of the first and second pairs and the cross piece leg members (15).

When the user wishes to deploy the canopy apparatus (10) of this invention the window of the vehicle is rolled down and the door is opened. Then the extension flap (33) of the top panel (30) is formed into a closed loop around the upper window frame portion (101") to secure the cover unit (12) to the vehicle door (102). At this time the framework member (14) is deployed by extending the plurality of telescoping leg members (15) outwardly to conform to the dimensions of the window. After this step has been accomplished the clamp element (19) on the first pair of leg members (15) is placed over the lower window frame portion (101") and the inboard tip portions (20) of the second pair of leg members (15) are inserted into suitably dimensioned pockets or sleeves (not shown) formed on the underside of the cover member (30) to operatively secure the cover unit (12) to the framework unit (11).

Figure 6:
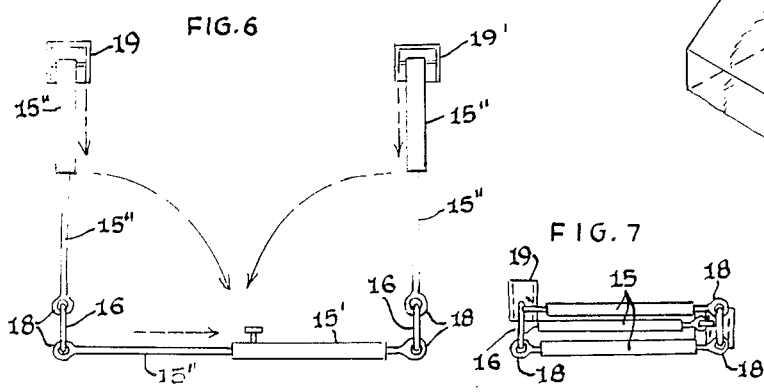
FIG. 6 is a bottom plan view of the framework unit in its extended disposition.
Figure 7:
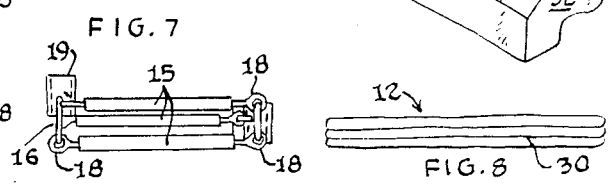
FIG. 7 is a side plan view of the framework unit in its collapsed disposition; and, FIG. 8 is a side plan view of the cover and auxiliary screen units in their folded disposition.
Figure 8:
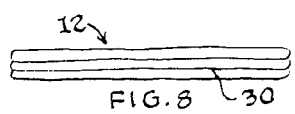

Now when the canopy apparatus (10) is to be removed the process is reversed with the telescoping leg members (15) being collapsed and pivoted into their storage configuration as depicted in FIGS. 6 and 7; and, then the cover unit (12) and the auxiliary screen unit (13) are folded into the storage configuration depicted in FIG. 8.

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A collapsible canopy apparatus for use in combination with the upper and lower window frame portions of a conventional vehicle door wherein the canopy apparatus comprises:

a cover unit including a cover member having a pair of side panels and a generally elongated rectangular top panel provided with an extension flap; wherein, the top panel and the extension flap are provided with cooperating securing means; wherein, the cooperating securing means allows the extension flap to be formed into a loop with the top panel wherein said loop surrounds the upper window frame portion of said vehicle; and, a framework unit comprising a framework member including a Plurality of telescoping leg members wherein said framework member is operatively engaged to the lower window frame portion of said vehicle.

2. The canopy apparatus as in claim 1 wherein said framework unit further comprises:

a pair of floating hinge elements that are operatively connected to one another and to said plurality of telescoping leg members.

3. The canopy apparatus as in claim 2 wherein at least one end of each of said plurality of leg members is provided with an eyelet element that is operatively engaged with one of said pair of floating hinge elements.

4. The canopy apparatus as in claim 3 wherein said plurality of leg members comprise:

a first pair of leg members;

a second pair of leg members; and, a cross-piece leg element that is secured on opposite ends to said pair of floating hinge elements.

5. The canopy apparatus as in claim 4 wherein said first pair of leg members are provided with clamp elements which are dimensioned to overlie the lower window frame portion of said vehicle door.

6. The canopy apparatus as in claim 1 further comprising:

an auxiliary screen unit operatively associated with the cover unit wherein the auxiliary screen unit comprises s sheet of netting that is releasably suspended from said cover member.

* * * * *